Nov. 7, 1967    K. A. SCHAFER    3,351,507
METHOD OF PREPARING LAMINATE WITH GRAIN SURFACE
Filed Oct. 16, 1964

INVENTOR.
KENNETH A. SCHAFER
BY
Harry B. Keck
ATTORNEY

United States Patent Office 3,351,507
Patented Nov. 7, 1967

3,351,507
METHOD OF PREPARING LAMINATE WITH
GRAIN SURFACE
Kenneth A. Schafer, Pittsburgh, Pa., assignor to Freeman Chemical Corporation, Port Washington, Wis., a corporation of Delaware
Filed Oct. 16, 1964, Ser. No. 404,422
8 Claims. (Cl. 156—60)

This application is a consolidation and therefore a continuation-in-part of applicant's two co-pending patent applications Ser. Nos. 131,835 and 131,838, both filed Aug. 16, 1961, both now abandoned.

This invention relates to laminated articles having an attractive grain surface presentation and to methods for preparing the same. More particularly this invention relates to laminated articles prepared from non-foaming thermosetting resinous materials such as unsaturated polyester resins, epoxy resins, phenol-formaldehyde resins, urea-formaldehyde resins, and the like.

According to this invention, molded plastic articles can be fabricated readily in flat or contoured surfaces with an attractive grain surface presentation by including as the outer element in a laminated article a sheet of flexible, resilient, foamed resinous material saturated with a thermosetting resinous composition in a liquid form. The preferred foamed resinous materials are those known as reticulated foams which have a high fluid permeability. Preferably the foamed resinous material is foamed polyurethane which has an open, connected cellular structure and is capable of being wetted by the thermosetting resin which is utilized in the fabrication of the laminate. The laminate is cured (i.e., the resin is converted to its hardened, thermoset condition) while the laminate is maintained under compression whereby the foamed resinous sheet material is substantially flattened from its initial uncompressed thickness. Thus the configuration of the foamed resin is presented against the exposed surface with the thermoset resin entirely filling the void spaces thereof. The resulting surface presentation varies somewhat according to the amount of compression which is applied to the laminate sandwich during the molding operation. The surface presentation varies principally according to the average diameter of the cells in the foamed resin. Specifically, where the foamed resin has relatively large average diameter cells, there will be a substantially greater portion of the resulting surface which is the thermoset resin and a lesser portion of the surface which is the cellular configuration of the foamed, open-connected-cell resin. That surface will, in general, have a marbleized appearance. Where the foamed resin has relatively small average cell diameters, the proportion of the resulting surface which is abutted by the foamed resin configuration is increased and the resulting surface presentation approximates a fine-grain leather. The variations in the actual compression of the foamed resin also will affect somewhat the appearance of the surface. In order to achieve the attractive surface presentation, however, some compression must occur during the resin-curing operation in order that the cellular configuration will be, at least in part, abutting the exposed surface of the finished article.

Use of opaque or transparent thermosetting resins can affect the appearance of the resulting laminated article. Use of opaque or neutral colored foamed resinous sheets also will affect the appearance of the resulting article as will be more fully set forth.

The foamed resinous material, as heretofore mentioned, is preferably flexible, resilient foamed polyurethane having open, connected cells. Other materials which have been investigated have been found to be undesirable for want of one or more of the following features:

The foamed resin must possess:
(1) Open-celled configuration;
(2) Flexibility;
(3) Elasticity;
(4) Ready compressibility; and
(5) Wettability with the liquid thermosetting resin.

Polyurethane foam is eminently satisfactory in the above-listed properties where the thermosetting resin is unsaturated polyester resin or epoxy resins.

The preferred foamed resin has cells of substantially uniform diameter in the range of 0.001 to 0.5 inch. The material is provided in sheet form having a thickness from about 0.05 to 2.0 inches in its uncompressed form. Such sheets may be readily compressed and thus substantially flattened from their initial uncompressed thickness.

The cells of the foamed resin must be open and connected. Polyurethane foams having open, connected cell structures have been described in U.S. Patent 2,961,710 and Canada Patent 620,248. The cell-wall breakdown described in thsee references is accomplished through the action of organic solvents and inorganic reagents acting upon the customary closed-cell polyurethane foams.

Thermosetting resins

Unsaturated polyester resins are well-known in the art as a thermosetting resinous material. Such resinous compositions are widely utilized in the fabrication of furniture, automotive vehicle parts such as fenders and body-moldings, boat hulls, machinery cases, machinery covers, helmets and the like. Frequently the unsaturated polyester resins are utilized in combination with fibrous reinforcing materials such as glass fiber mats, glass fiber fabrics, sisal fibers, hog-hair fibers, and the like. The unsaturated polyester resins usually are solutions of unsaturated polyesters in a polymerizable monomeric solvent such as styrene, vinyl toluene, acrylates, methacrylates and the like. The unsaturated polyester itself usually is formed by the esterification of glycols with dicarboxylic acids or acid anhydrides. At least a part of the dicarboxylic acid or acid anhydride contains ethylenic unsaturation, e.g., maleic acid, maleic anhydride, fumaric acid and the like. Some of the dicarboxylic acid or acid anhydride may be free of ethylenic unsaturation, e.g., phthalic acid isophthalic acid, terephthalic acid, adipic acid, succinic acid, phthalic anhydride and the like. The unsaturated polyester resin is dissolved in a polymerizable monomer to prepare the customary resinous compositions of the trade. Usually about 20 to 50 parts by weight of styrene and 80 to 50 parts by weight of the unsaturated polyester are mixed to formulate a typical unsaturated polyester resinous composition. On heating, such compositions form three-dimensional (thermoset) polymeric bonds without substantial shrinkage in the presence of a suitable polymerization catalyst, such as benzoyl peroxide. Customarily the thermosetting resinous compositions contain suitable pigmentation to present an opaque surface when cured. Unpigmented (clear) thermosetting resinous compositions also are known and widely used in the art, for example, in plastic glazing. The precise formulation of the unsaturated polyester resinous compositions forms no part of the present invention.

Objects

The principal object of this invention is to provide laminated articles and panels having attractive grain surface presentations.

A further object of this invention is to provide laminated articles and panels having wear-resistant surfaces.

A still further object of this invention is to provide laminated articles and panels having attractive surface presentations which resist crazing when subjected to flexural stresses.

Another object of this invention is to provide laminated articles and panels which resist star-crazing on the exposed surface when subjected to reverse impact stresses.

An additional object of this invention is to provide laminated articles and panels having sharply delineated geometric designs in their exposed surfaces.

A still further object is to provide laminated articles and panels having a clear surface which permits viewing of a surface within the article, through employment of clear (unpigmented) thermosetting resinous compositions.

These and other objects and advantages of this invention will become apparent from the following detailed description by reference to the accompanying drawings in which.

Figure 1:
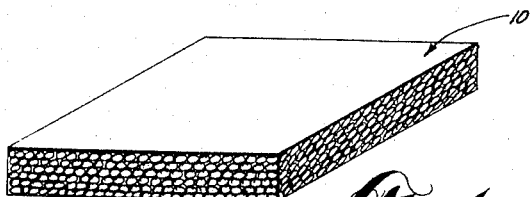
FIGURE 1 is a perspective illustration of a sheet of foamed resin utilized in this invention.

Referring to FIGURE 1, there is illustrated a fragmentary piece of resilient, flexible foamed resin 10 having open, connected cells. Polyurethane foams are especially preferred for use in the present inventions for the reasons set forth. The foamed resin 10 of FIGURE 1 contains individual cells of substantially uniform diameter. The walls of those cells have been broken, at least in part, whereby the entire structure is open and connected. The foamed resin 10 is flexible and elastic which permits it to be draped readily over contoured surfaces of mold apparatus. The foamed resin 10 is readily compressible whereby sheets ranging in uncompressed thickness from about 0.05 inch to about 2.0 inches can be readily compressed and substantially flattened from their initial uncompressed thickness. The foamed resin 10 furthermore readily soaks up and is wetted by liquid thermosetting resinous compositions, such as unsaturated polyester resins and epoxy resins.

Figure 2:
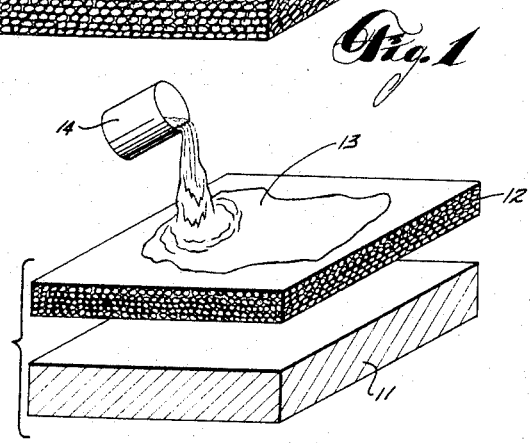
FIGURE 2 is a perspective illustration of the component elements which are utilized in the fabrication of the present laminated articles.

As seen in FIGURE 2, a typical laminate of this invention includes a sheet 11 of relatively stiff structural backing material having the desired structural properties and a sheet 12 of foamed resin. The stiff backing material sheet 11 may comprise wood, metal, fiberboard, cardboard, glass, reinforced resinous sheets, asbestos-filled Portland cement, plaster-board, preformed laminates, and the like. The thickness of the foamed resin sheet 12 preferably is from about 0.05 to 2.0 inches. The foamed resin has open, connected cell structures of average diameter in the range of 0.001 to 0.5 inch. A suitable thermosetting resinous liquid 13 is applied from a suitable container 14 to the foamed resin sheet 12 in sufficient quantity to fill entirely the void spaces in the finally compressed foamed resin sheet. The thermosetting resinous liquid 13, as applied, is unpolymerized, but polymerizable.

Figure 3:
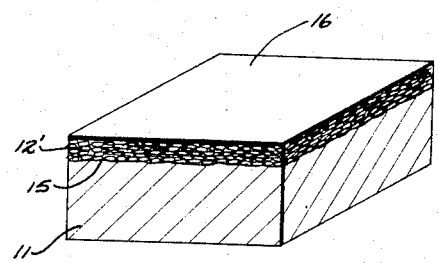
FIGURE 3 is an enlarged perspective illustration of a fragment of a laminated article formed from the elements shown in FIGURE 2.

As seen in FIGURE 3, the foamed resin sheet 12′ is compresed whereby it is in abutment with the exposed surface of the laminate so that its configuration is outwardly presented with the thermosetting resin entirely filling the void spaces to achieve the desired grain presentation. While the foamed resin sheet 12′ is maintained under the desired compression, the thermosetting resinous liquid is cured to a hard, three-dimensional material which retains the foamed resin sheet 12′ in its compressed flattened shape after the compressive force is removed.

Notice in the enlarged showing of FIGURE 3 that the upper surface 15 of the stiff backing element 11 is uneven as would be expected with a wooden surface, a Portland cement surface, and similar surfaces. The compressibility of the foamed resin sheet 12′ allows it to conform and to fill in all of the uneveness of the surface 15 and present an essentially smooth exposed surface 16 having the desired grain presentation. By utilizing foamed resin sheets 12 of one selected color (e.g., red, green, blue, et cetera) and a pigmented polyester resin 13 of a different coloring (e.g., white, yellow, gray, et cetera), attractive grain configurations can be achieved. The changes in the average cell diameters and compressions will affect the proportion of the foamed resin sheet 12′ coloring and the polyester resin 13 coloring which is externally presented.

While FIGURES 2 and 3 illustrate the foamed resin sheet 12, 12′ as covering the entire exposed surface, it is also possible that the foamed resin sheet 12, 12′ will cover only a portion of the exposed surfaces for developing attractive designs. In fact, as shown in FIGURES 4 and 5, it is possible to utilize an additional layer of preformed resin foam which is cut into a desired geometric configuration to be imbedded within the exposed surface along with the foamed resin sheet heretofore described.

Figure 4:
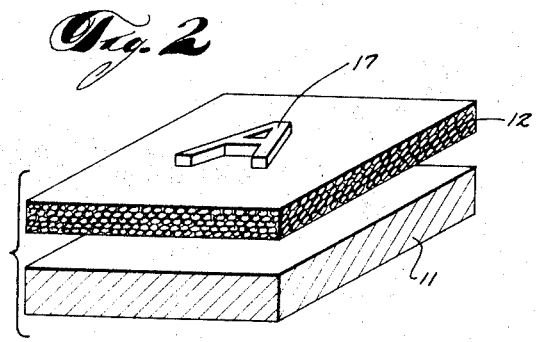
FIGURE 4 is a perspective illustration of the component elements which are utilized in the fabrication of the present laminated articles in an alternative embodiment.
Figure 5:
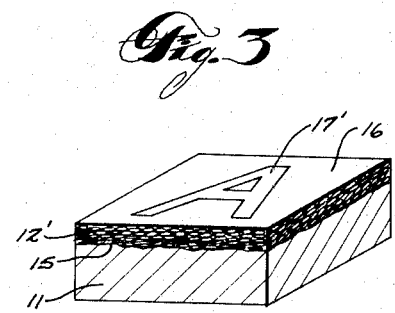
FIGURE 5 is a perspective illustration of a fragment of a laminated article from the elements shown in FIGURE 4.

Referring to FIGURE 4, the stiff backing element 11 and the sheet 12 of foam resin are positioned as illustrated in FIGURE 2. An additional sheet 17 of foamed resin is provided in a suitable geometric configuration—the alphabetic letter "A" is shown in FIGURE 4. The additional sheet 17 covers less than all of the area of the first sheet 12. That additional sheet 17 may be of a different color than the sheet 12; alternatively it may be of different average cell diameter than the underlying sheet 12; the difference permits a sharp delineation of the geometric shape of the additional sheet 17. The thermosetting resinous composition is applied as already described and the sheets 12, 17 are compressed against the stiff backing sheet 11 to allow the composition to be cured. After curing, the flattened sheet 17′ (and over the uncovered portions, the flattened sheet 12′) will be in abutment with the outer exposed surface 16. The sheet 17′ will be sharply delineated against the different sheet 12′ by virtue of its differing coloration or grain presentation. Letters, designs, trademarks, and the like can be presented in laminated articles or panels accordingly. The flattening of the sheet 12′ will be greater beneath the additional flattened sheet 17′ than in the uncovered portions.

The present laminated articles are especially useful as construction panels for walls, furniture, ceilings, and the like, where the stiff element 11 is flat or uniformly curved or bent. The laminates are especially useful in the manufacture of luggage, cases, trays, molding rails, framings, and the like. Where adhesion to a metal stiff backing element 11 is desired, epoxy resins are especially useful alone or in mixture with or in laminated relation with unsaturated polyester resins. The unsaturated polyester resins normally possess unacceptable adhesive properties for metal surfaces.

While the illustrations show the provision of the present grained surface over only one surface of the stiff backing element 11, it is possible to provide a decorative grained surface of this invention over both surfaces. The two surfaces, of course, may be similar or dissimilar in coloring and grain-size.

*Examples*

(1) A sheet of 3/16-inch thick pressed-wood was utilized as a stiff backing element. A sheet of foamed, open, connected cellular polyurethane foam was used as the foam resin sheet. The sheet had an average of 60 cells per inch.

An opaque unsaturated polyester resin composition containing 30 parts by weight of styrene and 70 parts by weight of unsaturated polyesters (ethylene glycol, maleic anhydride, phthalic anhydride) was applied to the foamed resin sheet. The foamed resin sheet was compressed against the pressed-wood and heated to cure the unsaturated polyester. The resulting laminate has an attractive grain configuration. The unsaturated polyester resin was opaque as a result of its pigmentation prior to application. The resulting panel had the coloring of the resin and the foam sheet in a grainy combination.

(2) As the stiff element of a laminated article, a sheet of ¼-inch thick asbestos board was used. This material is widely used in the construction industry as a paneling material for industrial buildings. The asbestos board is formed from long-fiber-filled cement which is hardened in relatively thin sheets. The foamed polyurethane sheet had an average of 45 cells per inch. Two sheets of the foamed resin were used, each ⅛-inch thick. After the unsaturated polyester (of Example 1) was cured, the resulting surface had an attractive grainy presentation. The exposed surface was completely smooth in contrast to the rough, uneven surface of the asbestos-board which served as the stiff element.

(3) The laminate of Example 2 was prepared again with the outer one of the two foamed polyurethane sheets covering less than the entire exposed surface of the laminate. The outer one of the sheets of foamed polyurethane differed in color from the larger size sheet which abutted the asbestos-board. Upon compression and curing, the boundaries of the outer sheet were sharply delineated against the background of the color of the inner sheet.

The laminated sheet of Example 1 was subjected to severe flexural stresses. The polyester resin surface of the sheet resisted cracking under the flexural stresses to a significantly greater degree than similar panels which did not contain the compressed foamed polyurethane sheets.

The laminated sheet of Example 1 was struck with a hammer on the side of the pressed-wood (reverse impact). The hammer impact developed a small star-craze which was visible through the resinous surface but did not develop actual cracks in the surface. A similar treatment of a laminated panel without the foamed polyurethane sheet compressed therein developed a more severe star-craze which broke through the resinous surface.

According to an alternative embodiment of this invention, as set forth in the aforesaid co-pending patent application S.N. 131,838, a suitable clear thermosetting resinous liquid is combined with a foamed resin sheet to permit viewing of the uneven surface 15 (FIGURE 3) where this is desired. The foamed resin may itself be pigmented or dyed. The clarity of the coating can be greatly increased by utilizing unpigmented neutral colored foamed resin sheets which actually "disappear" into the hardened thermosetting resinous composition.

Such laminated articles utilize a structural backing element which usually has an attractive surface appearance, e.g., a sheet of wood having an attractive grain or textured surface, a sheet of paper or fabric having an attractive pattern or design, and the like. By virtue of the "disappearance" of the present foamed resin sheet into the thermoplastic resinous composition, a thin, outer coat of wear-resistant thermoplastic material is provided to protect the attractive textured surface.

Where the structural backing element of the laminated article does not intrinsically possess an attractive surface, it is possible by the present invention to provide a sheet of paper, fabric or the like in outboard relation to the structural backing element which will present the desired attractive appearance.

Figure 6:
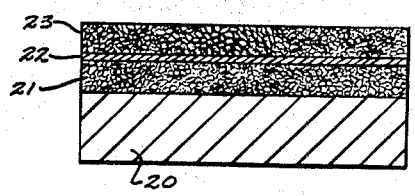
FIGURE 6 is a perspective illustration of the component elements which are utilized in the fabrication of an alternative embodiment of this invention.

This is illustrated in FIGURE 6, where a structural backing element 20 might consist of long-fiber-asbestos-filled Portland cement sheet which is utilized widely in the fabrication of building panels. A first sheet of foamed polyurethane 21 according to this invention is placed upon the structural backing element 20 and saturated with suitable thermosetting resinous composition. Thereafter a sheet 22 of paper, fabric or the like having an attractive outer surface texture or design is applied over the foamed resin sheet 21. A second sheet of foamed resin 23 is applied over the design sheet 22 and saturated with thermosetting resinous composition. The first foamed resin sheet 21 serves to fill in the unevenness of the surface of the structural backing element 20 as heretofore described. The second sheet of foamed resin 23 serves as a protective wear-resistant cover along with the thermosetting resinous composition.

Figures 7, 8:
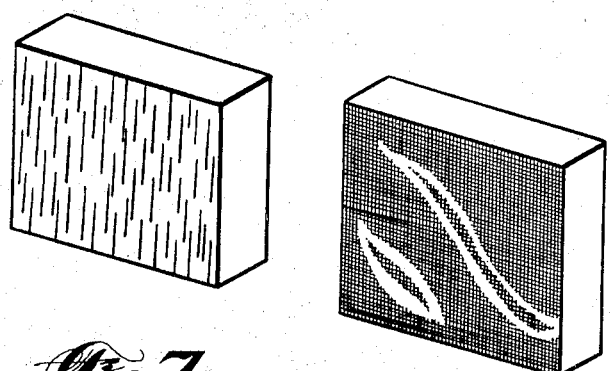
FIGURES 7 and 8 are illustrations of a typical textured-surface element which may be utilized as a structural backing element in this invention.

Under compression, both of the sheets of foamed resin 21 and 23 are compressed and substantially flattened from their initial uncompressed thickness as described and the thermosetting resinous composition is allowed to cure into a hardened thermoset condition while the compression is maintained.

Where the structural backing element 20 is a metal sheet, it may be desirable that the thermosetting resinous composition which is applied to the inner sheet 21 of foamed resin be an epoxy resin which has excellent adhesive properties.

Where the structural element is a sheet of wood veneer, the grain of the wood veneer, as indicated in FIGURE 7 can be seen through the clear resinous coating of this invention. Where the structural backing element is, for example, pressed wood, the typical criss-cross pattern of the reverse side of such pressed-wood fiber-board presents an attractive appearance when viewed through the clear resinous outer coating of this invention, as seen in FIGURE 8. The foamed resin fills the unevenness of the criss-cross surface under compression during the cure of the thermosetting resinous composition.

*Examples*

(4) A sheet of 3/16-inch thick pressed wood having a criss-cross pattern embossed into one surface thereof was utilized as the structural backing element for a laminated panel. A sheet of foamed polyurethane having open connected cells was positioned over the criss-cross patterned surface of the pressed wood. The foamed polyurethane had an average of 60 cells per inch and was about ⅛-inch thick. The foamed polyurethane was saturated with a liquid thermosetting resinous composition consisting of about 70 parts by weight of glycol-maleate-phthalate unsaturated polyester dissolved in about 30 parts by weight of styrene. The thermosetting resinous composition contained benzoyl peroxide as a polymerization catalyst. The saturated foamed polyurethane resin was compressed against the pressed wood surface and the laminate was heated to allow the thermosetting resinous composition to cure while the foamed polyurethane was maintained under compression. A clear film about 1/32-inch thick was presented over the surface of the pressed wood. The criss-cross pattern of the pressed wood could be viewed through the clear resinous coating. The coating was free of entrapped bubbles and free of blisters. The use of excessive heat may tend to cause separation of the pressed-wood structural element unless suitable precautions are observed.

(5) A sheet of long fiber asbestos-filled cement sheeting was used as a structural backing element in the fabrication of a laminated panel. A first sheet of foamed polyurethane having open, connected cells was applied to one surface of the asbestos-filled cement sheet and saturated with a clear thermosetting resinous composition as described in Example 4. A sheet of paper having a wood-grain design printed on one side thereof was placed with its unprinted side in contact with the first resin-impregnated foamed polyurethane. A second sheet of foamed polyurethane having open connected cells was applied over the paper in contact with the printed surface thereof. A clear thermosetting resinous composition as described in Example 4 was applied to the second sheet of foamed polyurethane. Both sheets of foamed polyurethane had an average of 60 cells per inch and both sheets were approximately ⅛-inch thick in uncompressed form. The laminate was compressed and the thermosetting resinous composition was allowed to cure while the foamed polyurethane was maintained under compression. The cured coating was about 1/32-inch thick. The pattern printed on the paper surface could be readily viewed through the clear outer resinous film. The resulting panel appeared not unlike a sheet of natural wood having a thick varnish coating. The panel was free of entrapped bubbles and free of blisters.

(6) A laminated panel was prepared as described in Example 5 with the exception that a sheet of glass-fiber was used to replace the printed paper sheet. The glass fiber fabric had a printed pattern on one surface thereof. When the laminated panel was cured, the printed pattern could be viewed through the clear coating.

The laminated sheet of Example 4 was subjected to severe flexural stresses. The polyester resin surface of the sheet resisted cracking under the flexural stresses to a significantly greater degree than similar panels which did not contain the compressed foamed polyurethane sheets.

The laminated sheet of Example 4 was struck with a hammer on the side of the pressed-wood (reverse impact). The hammer impact developed a small star-craze which was visible through the resinous surface but did not develop actual cracks in the surface. A similar treatment of a laminated panel without the foamed polyurethane sheet compressed therein developed a more severe star-craze which broke through the resinous surface.

I claim:
1. The method of making a laminated article which comprises forming a sandwich of a stiff structural backing element and a sheet of flexible, resilient, foamed resin having open, connected cellular configuration, applying a non-foaming thermosetting resinous composition in liquid form to the said foamed resin whereby the said foamed resin becomes wetted with the said resinous composition, compressing the said foamed resin against the said stiff backing element and curing the said resinous composition while maintaining the said foamed resin under compression to achieve a substantial flattening of the said foamed resin from its initial uncompressed thickness, whereby the said foamed resin configuration appears as a grainy presentation over the said exposed surface.

2. The method of claim 1 wherein the said foamed resin is polyurethane foam.

3. The method of claim 1 wherein the said thermosetting resinous composition is selected from the class consisting of unsaturated polyester resins and epoxy resins and their mixtures.

4. The method of claim 1 wherein the said sheet of foamed resin is neutral colored and the said thermosetting resinous composition is clear whereby the said structural backing element can be viewed through the resinous coating.

5. The method of making a laminated article having a sharply delineated geometrical design over its exposed surface and having an attractive grain surface which comprises forming a sandwich of a stiff structural backing element, a first resilient sheet of flexible foamed resin having open, connected cells, and a second resilient sheet of flexible foamed resin having open, connected cells, having the said geometrical design and having a lesser surface area than the said first sheet, applying a non-foaming thermosetting resinous composition in liquid form to the said foamed resin sheets, whereby the said sheets become saturated with the said composition, compressing the said sandwich until the said foamed resin is in abutment with the exposed surface and curing the said composition while maintaining the said foamed resin under compression to achieve substantial flattening of both foamed resin sheets from their initial uncompressed thickness, whereby the said foamed resin configuration appears as a grainy presentation over the said exposed surface, the said second sheet appearing over its entire area, and the said first sheet appearing over those portions not covered by the said second sheet.

6. The method of claim 5 wherein the said two sheets of foamed resin are of different coloration.

7. The method of claim 5 wherein the said foamed resin sheets have cells which are of different average cell diameter.

8. The method of making a laminated article comprising applying over a sheet of stiff structural backing material a first resilient sheet of open, connected flexible cellular foamed polyurethane, saturating the said first sheet of foamed polyurethane with a non-foaming thermosetting resinous composition in liquid form; applying a sheet of decorative material over the said first sheet of foamed polyurethane; applying a second resilient sheet of neutral-colored, open, connected, flexible cellular foamed polyurethane over the said sheet of decorative material; saturating the said second sheet of foamed polyurethane with a clear non-foaming thermosetting resinous composition; compressing the laminated sheets together and curing the said thermosetting resinous composition while maintaining the said sheets under compression to achieve a substantial flattening of both of said sheets of polyurethane from their initial uncompressed thickness, whereby the said sheet of decorative material may be viewed through the outer resinous coating of the laminated article.

References Cited

UNITED STATES PATENTS

| | | | |
|---|---|---|---|
| 1,267,890 | 5/1918 | Moore | 161—95 |
| 1,863,239 | 6/1932 | Cochrane | 161—88 XR |
| 2,694,028 | 11/1954 | Rapp | 156—310 XR |
| 2,744,047 | 5/1956 | Ingrassia et al. | 156—311 |
| 2,810,674 | 10/1957 | Madden | 161—184 XR |
| 2,951,001 | 8/1960 | Rubenstein | 161—91 |
| 2,987,431 | 6/1961 | Buchler | 161—231 XR |
| 3,018,206 | 1/1962 | Hood et al. | 161—205 |
| 3,021,239 | 2/1962 | Lindenfelser et al. | 161—205 XR |
| 3,070,476 | 12/1962 | Miller | 156—548 XR |
| 3,150,032 | 9/1964 | Rubenstein | 161—161 |
| 3,193,435 | 7/1965 | Schafer | 161—40 |
| 3,193,437 | 7/1965 | Schafer | 161—89 |
| 3,223,576 | 12/1965 | Evans et al. | 161—84 |

FOREIGN PATENTS 468,150    5/1945    Canada.

JACOB H. STEINBERG, *Primary Examiner.*

ALEXANDER WYMAN, *Examiner.*

W. POWELL, *Assistant Examiner.*